C. H. PERRIN.
APPARATUS FOR FILTERING LIQUIDS.
APPLICATION FILED DEC. 21, 1908.

915,695.

Patented Mar. 16, 1909.

WITNESSES
L. H. Grote
M. E. Levi

INVENTOR
Charles Henri Perrin
BY
Henson and Henson
ATTORNEYS

UNITED STATES PATENT OFFICE.

CHARLES HENRI PERRIN, OF CHÂLON-SUR-SAÔNE, FRANCE.

APPARATUS FOR FILTERING LIQUIDS.

No. 915,695.  Specification of Letters Patent.  Patented March 16, 1909.

Application filed December 21, 1908. Serial No. 468,491.

*To all whom it may concern:*

Be it known that I, CHARLES HENRI PERRIN, a citizen of the Republic of France, residing in Châlon-sur-Saône, France, manufacturer, have invented certain new and useful Improvements in Apparatus for Filtering Liquids, of which invention the following is a full, clear, and exact description.

This invention relates to apparatus for filtering liquids and particularly to an apparatus adapted to employ a fibrous or pulpy substance as the filtering medium, my object being to provide an improved device of the character mentioned.

Briefly the apparatus comprises a series of superposed filter elements adapted to be utilized separately to form a series of independent filters or to be combined as a multiple filter when a more thorough filtering action is desired.

Figure 1:
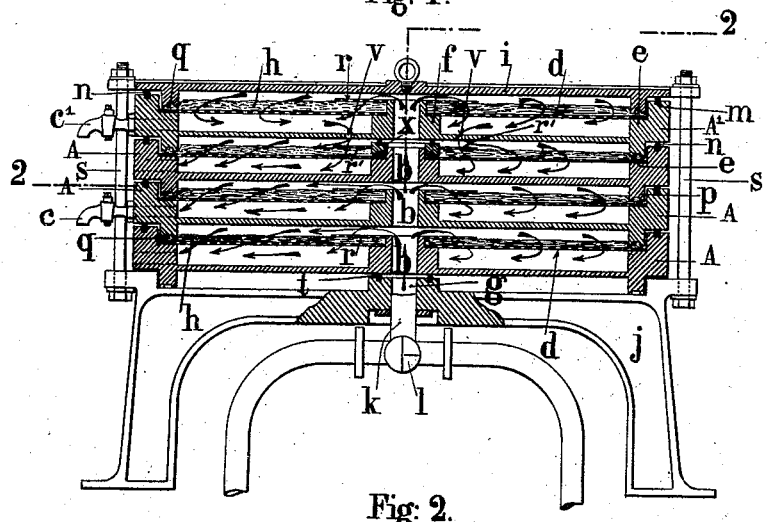
Figure 2:
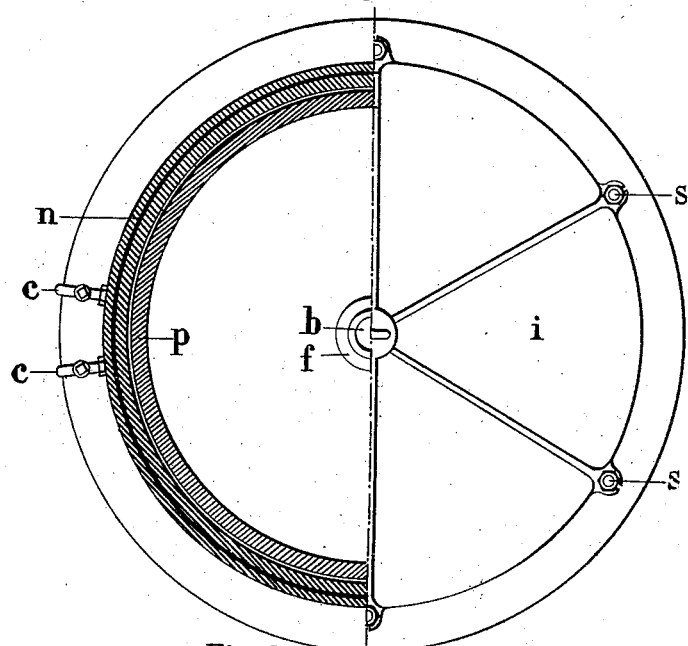
Figure 3:
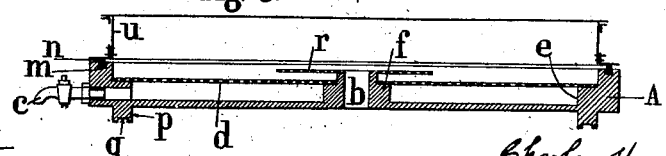

An apparatus embodying my invention is shown in the accompanying drawings in which, Figure 1 is a vertical section of the apparatus; Fig. 2 a plan view half in section on the line 2—2, Fig. 1; and Fig. 3 is a vertical section of one of the filter sections provided with detachable rim diagrammatically represented.

The apparatus comprises a series of superposed filter elements or plates A, each provided with a short pipe or passage $b$ by means of which the various plates A communicate with the inlet pipe $k$. Each element carries a perforated plate $d$ supported on shoulders $e$ and $f$ and carrying a layer $h$ of filtering material. An outlet cock $c$, preferably one for each plate, permits the escape of the filtered liquid after it has passed through the layer $h$.

To render the apparatus liquid tight, rubber gaskets $n$ are fitted in grooves $m$ in the upwardly extending rim flange on each plate. The superposed plates resting on these gaskets are pressed firmly together between the frame $j$ and the cover $i$ by the bolts $s$ which pass through lugs on each of the latter. For the same purpose as well as to hold the filtering material in position each plate and also the lid is provided with a downwardly extending flange $p$ inside said rim flange, in which a groove $q$ is formed. This flange fitting inside the rim flange of the next lower plate A, rests upon filter layer $h$ carried by the perforated plate $d$.

A supplemental plate $r$ of less diameter than the plate $d$ is fitted around the hub forming the passage $b$ and is adapted to be placed on said hub after the filtering material has been flowed onto the plate $d$. It serves the double purpose of holding the material in place and protecting the same from the inflow of the liquid to be filtered.

If it is desired that each filtering element be used independently the liquid to be filtered, which may conveniently be under pressure, is admitted by the three way cock $l$ to the pipe $k$ which communicates at $g$ with the passage $b$ of the lowest plate. The joint between the pipe $k$ and the plate A is made tight by means of the gasket $t$. The liquid passes up through the passages $b$ overflowing into the compartments formed between the plates and passing through the filtering layers $h$ escapes at the cocks $c$, $c^1$, etc. at the levels of the various plates. If however it is desired that the liquid shall pass through more than one filtering layer so as to be more thoroughly freed of impurities, the overflow opening from the passage $b$ onto one or more of the plates is closed by one or more spacing rings $x$, provided with suitable gaskets and plates $r^1$, which is or are interposed between adjacent plates A. The liquid is thus carried up through the spacing piece $x$ to the plate $A^1$ and passing through its filter layer, descends (the cock $c^1$ being closed) through the holes $v$ which are normally closed by screws, to the plate below, where it is filtered a second time and either escapes by the cock $c$ or is carried down to the next plate by a similar device. The holes $v$ are preferably located above the plate $r$ or $r^1$ so that the descending liquid does not dig up the filtering layer $h$. By this arrangement of the filtering plates the process may be made of varying degrees of thoroughness since the liquid may be passed through one or all of the plates before it escapes from the apparatus.

The filtering layer may be formed of any suitable substance such as asbestos, fiber, wood or paper pulp or other convenient pulpy or fibrous substance. This is preferably flowed upon the plates in the form of a suspension, an upwardly extending rim $u$ (diagrammatically shown in Fig. 3) being adjusted on the plate during this operation to retain the suspension liquid. As the latter flows off through the cock $c$ the filtering material settles on the perforated plate $d$ and may, if necessary, be subjected to pressure before the perforated ring $r$ is adjusted.

If a liquid such as sugar syrup is passed through the filter it is desirable to connect a pipe with the inlet $k$ through the three way cock $l$ so that after the filter has been in operation for a time the flow of the syrup may be cut off and a stream of heated water passed through to dissolve such sugar as may remain in the filter. The apparatus may then be taken apart by loosening the bolts $s$ and the filtering layers removed, cleansed and returned or replaced by fresh material.

Obviously the particular shape of the plates A is immaterial, though they are here shown as circular, which is the most convenient form. Again the passages $b$ need not be in the center of the apparatus, although it is desirable that they should be placed one above the other so that the plates may be readily coupled together for multiple filtering in the manner described.

The apparatus may be varied in detail without departing from the scope of my invention and I do not limit myself to the precise structure shown.

I claim as my invention:

1. A filter apparatus having a series of superposed independent filter elements, having superposed inlet passages spaced apart for the direct admission thereto of the liquid to be filtered, in combination with a hollow spacing member adapted to be adjusted between said passages to unite the same thereby cutting off the direct supply to one of said elements and means for admitting to the latter the liquid passing through the other so as to obtain a multiple filter action, substantially as described.

2. A filter apparatus having a series of superposed filter elements having communicating inlet passages spaced apart for the direct admission thereto of the liquid to be filtered, in combination with an independent spacing member adapted to be adjusted between adjacent elements to unite the inlet passages thereof thereby cutting off the direct supply to one of said elements together with means for admitting to the latter the liquid passing through the other so as to obtain a multiple filter action, substantially as described.

3. A filter apparatus comprising a series of superposed plates having communicating inlet passages spaced apart for the direct admission to each element of the liquid to be filtered, filtering means carried by each plate and an independent outlet for each filter element, in combination with a spacing member adapted to unite the inlet passages of two of said plates thereby cutting off the inlet to one of the same, the other plate being perforated by a hole normally closed but which may be opened to permit the flow of the material to be filtered to the plate to which the supply from the common inlet has been cut off by said spacing inlet so as to produce a multiple filter action, substantially as described.

In testimony whereof I have signed my name to this specification, in the presence of two subscribing witnesses.

CHARLES HENRI PERRIN.

Witnesses:
   CHARLES DONY,
   BENJAMIN BLOCHE.